United States Patent [19]

Bode et al.

[11] Patent Number: 4,649,309
[45] Date of Patent: Mar. 10, 1987

[54] CONNECTION ARRANGEMENT FOR ARMATURE CONDUCTORS WITH COMMUTATOR SEGMENTS, AND CONNECTING MACHINE

[75] Inventors: Werner Bode, Hildesheim; Peter Franz; Heinrich Wilke, both of Diekholzen, all of Fed. Rep. of Germany

[73] Assignee: Robert Bosch GmbH, Stuttgart, Fed. Rep. of Germany

[21] Appl. No.: 637,764

[22] Filed: Aug. 6, 1984

[30] Foreign Application Priority Data

Aug. 6, 1983 [DE] Fed. Rep. of Germany ....... 3328527

[51] Int. Cl.⁴ ............................................ H02K 13/04
[52] U.S. Cl. ..................................................... 310/234
[58] Field of Search ............... 310/234, 233, 232, 235, 310/236, 71, 249, 214

[56] References Cited

U.S. PATENT DOCUMENTS

| 2,476,795 | 7/1949 | Avigdor | 310/233 |
| 3,522,462 | 8/1970 | Schwartz | 310/234 |
| 4,402,130 | 9/1983 | Tsuruoka et al. | 310/234 X |

FOREIGN PATENT DOCUMENTS 54-131705 10/1979 Japan ................... 310/234

Primary Examiner—Donovan F. Duggan
Attorney, Agent, or Firm—Frishauf, Holtz, Goodman & Woodward

[57] ABSTRACT

To retain end portions (10,11) of armature conductors in slots (6, 37) formed in radially projecting lugs (5) of armature segments (2) of a commutator (1), the side walls of the slots are formed with a deviation from a plane surface, for example by a recess (7) or an inwardly extending projection (38), and the end portions (10, 11) of the windings are then placed in the slot and deformed under punch or stamping pressure to form, together with the recess or the region adjacent the projection, an interfitting projection-and-recess connection which will withstand high centrifugal forces, and prevent loosening of the connection under conditions of shock, vibration, high temperatures and temperature changes, to make the connection particularly suitable for installation in mobile, typically automotive dynamo electric machines. The apparatus to make the connection includes a punch press which can either sequentially or simultaneously place one or two end portions (10, 11) of conductors into the slots (6, 37) of the lugs. For further clamping, the edges of the lugs adjacent the walls of the slots can be deformed, for example by shearing, to overlap the uppermost end portion (11) of the conductors.

18 Claims, 16 Drawing Figures

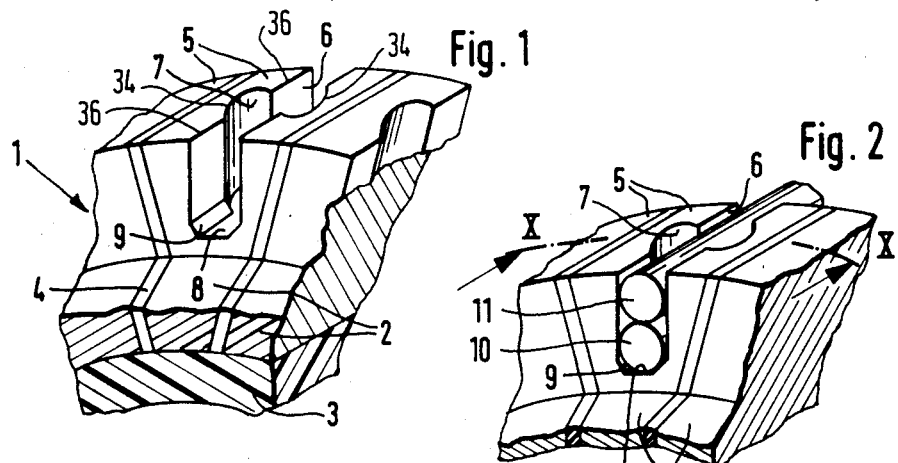
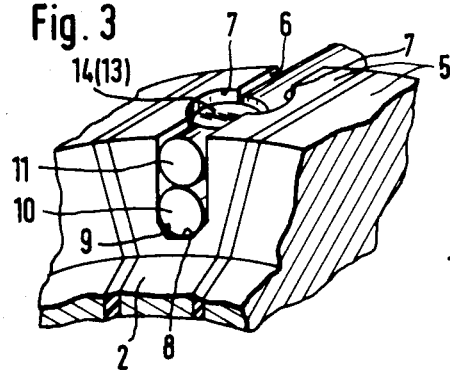
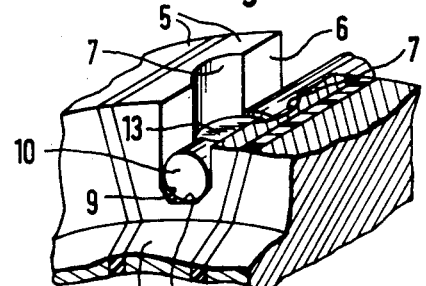
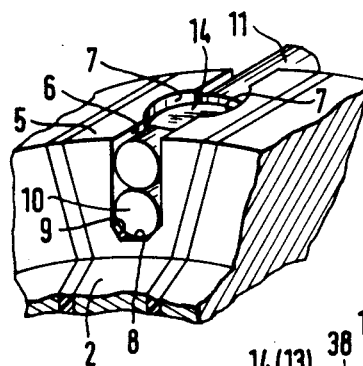
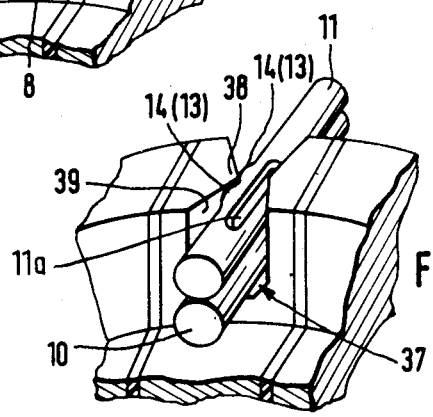

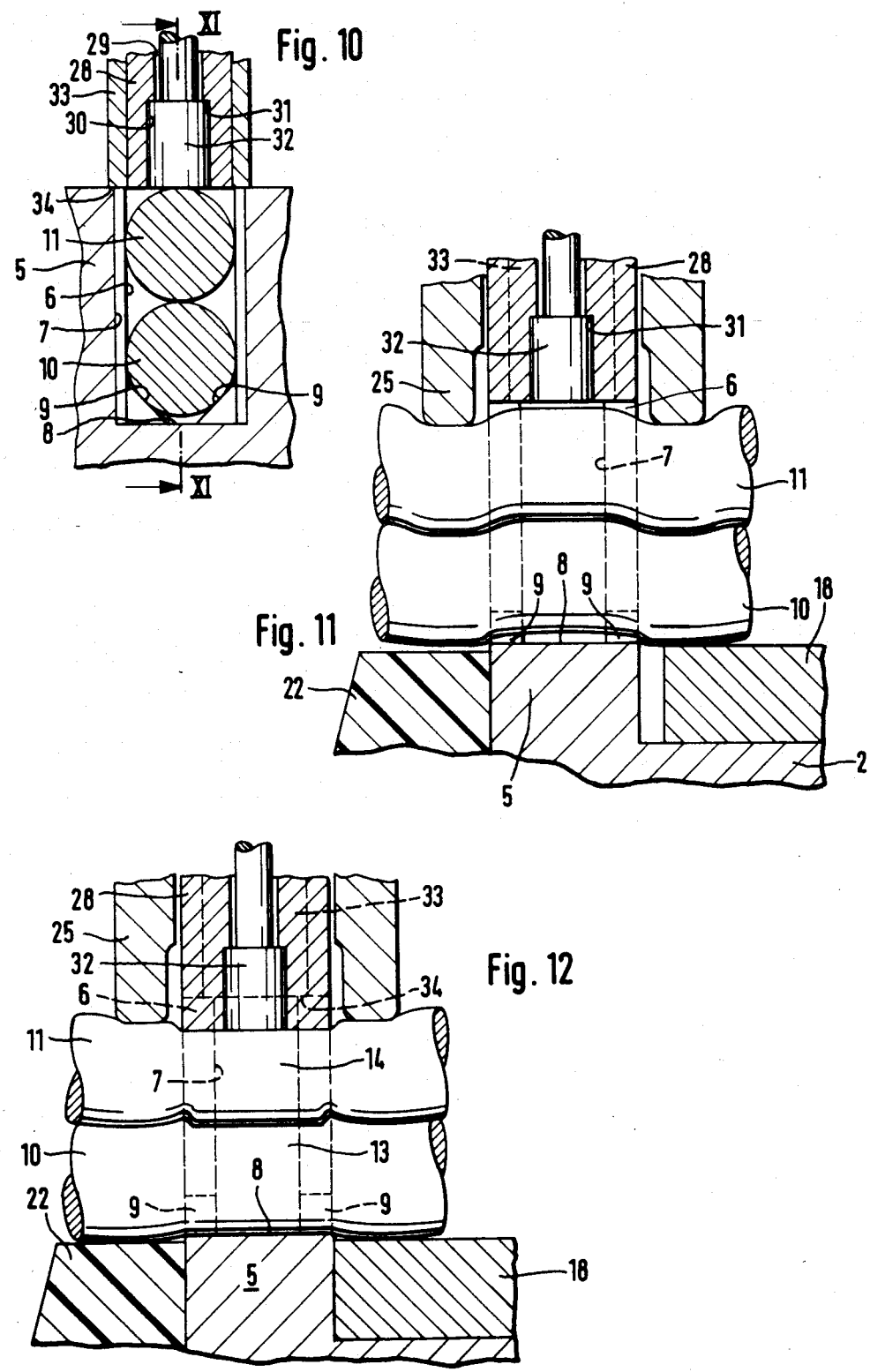

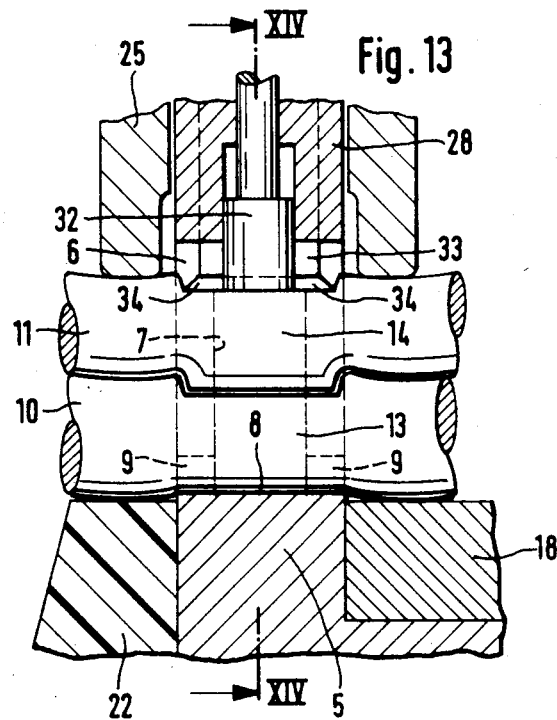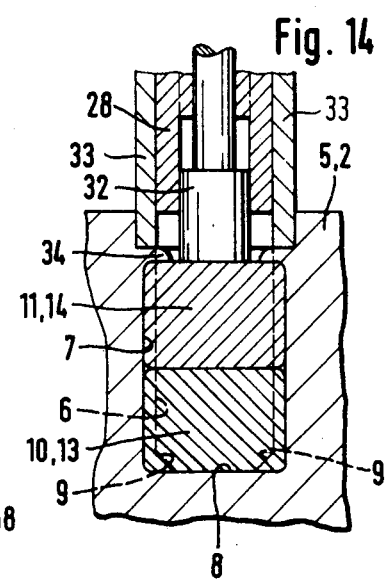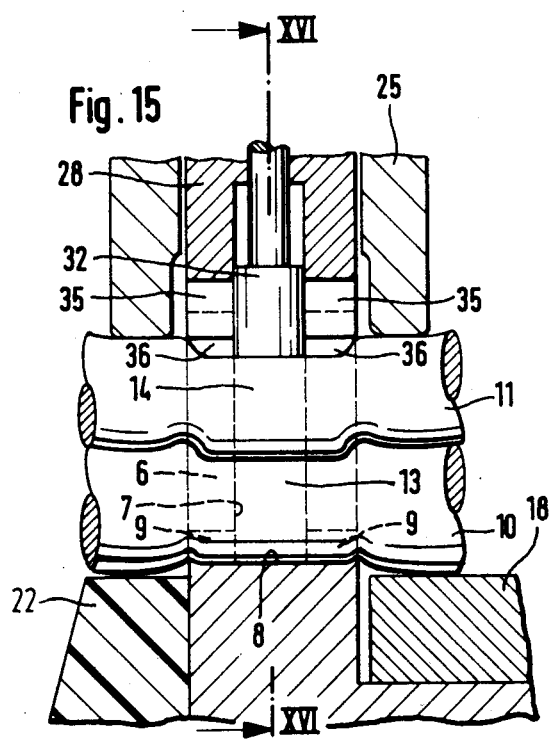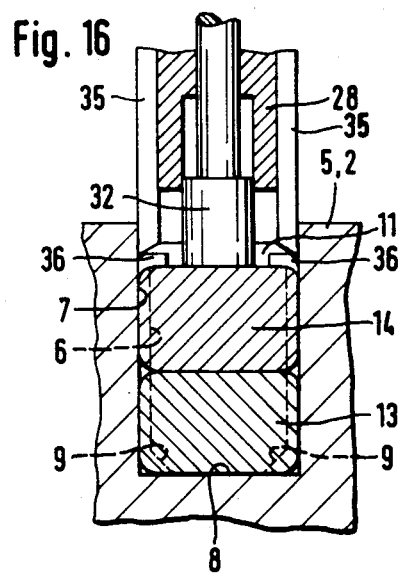

CONNECTION ARRANGEMENT FOR ARMATURE CONDUCTORS WITH COMMUTATOR SEGMENTS, AND CONNECTING MACHINE

The present invention relates to dynamo electric machines, and more particularly to commutator-type dynamo electric machines, and especially to a connection arrangement between the windings or conductor ends of armatures of the dynamo electric machine to the commutator, and to apparatus for effecting the connection. The connection arrangement is particularly suitable for use in motors, such as starter motors, installed in automotive vehicles, where severe requirements are placed on all electrical connections with respect to resistance to shock, persistent vibration independent of operation of the motor, temperature changes, and the like, and to vehicular blower and pump motors.

Background

It has previously been proposed to secure the ends of armature windings of dynamo electric machines in grooves or slots formed in connecting tabs or lugs radially projecting from the generally cylindrical segmental portions of a commutator. It has been found that such connectons unfortunately are not sufficiently resistant to centrifugal forces arising in operation of the dynamo electric machine and provide for electrically and sure connection between the commutator segments and the winding or conductor end portions, while having the necessary resistance to heat, vibration, and other temperature changes which effect dynamo electric machines installed in automotive vehicles. Varying influences, compounded by shocks and vibrations, have the tendency to shake loose the connections between the windings and the commutator lugs although the winding ends may have been deformed to fit into the slits.

In order to improve the reliability of connection, it has been proposed to use various thermal connecting aids, such as brazing, soldering, welding, and the like. It is difficult, in practice, to carry out such additional operation since the insulation between adjacent commutator segments and the insulation between the commutator segments and the shaft of the dynamo electric machine may be sufficiently affected by the processing heat to deteriorate, and impair the reliable mechanical holding capability of the insulation as well as the electrical characteristics thereof. Thus, it has been proposed to connect the ends of armature windings in slots of the commutator lugs by hot staking. Not only is such process unsatisfactory from a mechanical strength point of view, but the insulation between adjacent segments, particularly in smaller commutators, or commutators with a fine division, that is, many commutator segments, suffers. It has also been proposed to use soft-solder for the ends of the windings. Soft-solder connections, however, have insufficient temperature resistance characteristics so that the connection is insufficiently reliable when installed in motors which run at high speed and which may, additionally, be subjected to high temperatures, for example if installed in the engine compartment of an automotive vehicle and used, for example, as a drive motor for a pump. It has been found that soft-solder connections in the commutator region may result in defective motors, in operation, since, upon high-speed operation, the ends of the windings may be thrown out of their connecting slots from the commutator lugs due to centrifugal force. Brazing the ends of the armature windings to the commutator lugs is expensive and uneconomical, and further results in heating of the commutator segments to such an extent that additional apparatus and operating steps are required to protect the insulation between adjacent segments and between the segments and the shaft. Yet, damage to the insulation cannot be excluded.

It has also been proposed to use diffusion welding to connect armature windings to slots in the commutator segments. This is a time-consuming operation, and not suitable for large-scale mass production. Particularly if smaller commutators or commutators with many narrow segments are used, precautions have to be taken to protect the insulation between the adjacent commutator segments and between the commutator segments and the armature shaft.

The Invention

It is an object to provide an attachment arrangement which will reliably connect the ends of armature windings to commutator segments, which is resistant to centrifugal force arising in high-speed operation of the motor with which the commutator is used, which is simple to apply and results in a reliable mechanical as well as electrical connection of the commutator segments to the armature windings.

Briefly, the commutator segments are formed with lugs which have slots cut therein. In accordance with the invention, the side walls of the slots are formed with an elongated, radially extending deviation from a plane which is at least approximately parallel to the plane passing through the longitudinal axis of the commutator and a central line of the slot; such a deviation may, for example, be elongated depressions or recesses formed in the side walls defining the slots, for example by a part-circular recess in each side wall; or by an elongated projection, for example in triangular form, in which the apex of the projection may be positioned for example centrally of the axial extent of the lug. The armature conductor, or a plurality of conductors which may be located above each other, is or are inserted in the slot and distorted by a suitable deforming or punching die or tool, so that the conductor—typically copper—will fit into or, respectively, around the slot deviation, and to form therewith an interengaging projection-and-recess connection. It has been found that this connection of conductor surface distortion—slot surface deviation is not only axially secure but, additionally, prevents radial throw of the ends of the windings even upon high-speed operation of the motor. The effective area of frictional engagement between the conductors and the side walls of the segments is enhanced with respect to straight side walls by the deviation or distortion, respectively from the aforementioned plane.

In accordance with a feature of the invention, the terminal edges of the lugs which preferably extend higher than the height of the winding end or ends placed in the slots can be deformed to at least in part fit over or overlap the ends of the armature windings. This deformation can be done at the same time and in essentially the same operating step which is also used to deform the conductors to fit into or around the deviation from the aforementioned plane of the commutator connecting slot.

In accordance with a feature of the present invention, the ends of the armature windings are placed into the preformed slots of the commutator lugs, and deformed or distorted by a simple punch or stamping tool to fit into or around the aforementioned deviation. The tool can be so made that a plurality of punch or press elements act radially inwardly against the plurality of commutator segments, all at the same time.

The punch or stamping tool can be made a plurality of for example concentric tool elements, some of them functioning as hold-down parts, others as deforming punch elements which deform or distort the connecting wire or conductor, and others, still, to deform the edge portions of the commutator lugs, for example by shearing the edge portions and folding the sheared ends over the top of the already deformed and firmly seated armature conductors.

The connecting arrangement has the advantage that it is simple to make and permits mechanically and electrically reliable connections to be made entirely in a mechanical process, while resulting in a tight mechanical and electrically conductive connection of the ends of armature windings in the slots of commutator segments. The connecting arrangement is immune to high temperatures, and changes in temperature, as well as being immune to vibrations. The tools to make the connections are simple, and have long operating life without maintenance or re-grinding. Even under high-speed and high-temperature operating conditions, the connection will remain mechanically secure and electrically highly conductive.

The arrangement has the additional advantage that the connecting pattern of the ends of the windings of the armatures can be selected as desired; ends of windings can be placed simultaneously into the armature slot and deformed in one punch operation; alternatively, they can be placed into the armature slot individually, and individually deformed, one after the other, and placed one on top of the other. One, or more, and in some instances all of the ends of the armatures can be connected simultaneously. No interference with the thermal qualities of the insulating material between the adjacent segments of the commutator or between the commutator or the shaft of the armature will result.

In a preferred form of the invention, the commutator segments can, additionally, be deformed in essentially the same operating step as the deformation of the ends of the windings, thus additionally enhancing the reliability of the connection both from an electrical as well as from a mechanical point of view. Deforming the edges of the commutator lugs adjacent the slots by shearing, and folding over of the edges, is particularly suitable, especially for high-speed machines subjected to severe operating environments or conditions, such as high temperatures, substantial changes in temperature, shock, vibration, environmental contamination by dirt, road salt, humidity, and the like.

Drawings:

FIG. 1 is a highly schematic fragmentary view of the connecting portions of a commutator of an armature;

FIGS. 2 and 3 illustrate sequential steps in the connection of the ends of armature conductors in the slots of the commutator of FIG. 1;

FIGS. 4 and 5 illustrate sequential steps of the connection of armature conductors in which each armature conductor is individually deformed;

FIG. 6 is a fragmentary view similar to FIG. 1, illustrating another embodiment of an armature connecting lug;

FIG. 7 is a view similar to FIG. 2, illustrating placement of armature conductors in the slot of FIG. 6;

FIG. 10 is an end axial view, taken along line X—X of FIG. 2 in combination with a deforming tool;

FIG. 11 is an illustration of the arrangement of FIG. 10, in axial section along line XI—XI of FIG. 10 in advance of attachment of the ends of the windings in the armature lugs;

FIG. 12 is similar to FIG. 11 and shows the attachment of the ends of the armature windings, that is, the arrangement of FIG. 11 in a subsequent processing step;

FIG. 13 is a view similar to FIG. 12 and showing a modification of the attachment tool;

FIG. 14 illustrates the tool of FIG. 13, in section along line XIV—XIV of FIG. 13;

FIG. 15 shows the arrangement of FIG. 13 with an additional modification; and

FIG. 16 illustrates the arrangement of FIG. 15 along the section line XVI—XVI of FIG. 15.

DETAILED DESCRIPTION, WITH REFERENCE TO FIGS. 1-5

Figure 8:
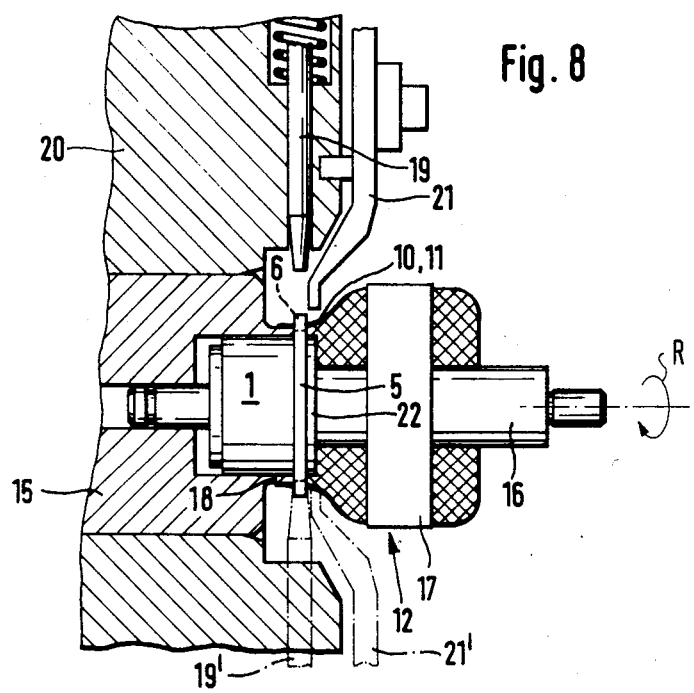
FIG. 8 is a schematic side view of a deforming apparatus for the conductors, to make the connection illustrated in FIGS. 3, 4 and 5, for example.

A commutator 1 for dynamo electric machines, typically pump motors, starter motors, or the like, and especially adapted for vehicular use, particularly automotive vehicles, has a plurality of segments 2 which are insulated with respect to each other by an insulating layers 4. The segments 2 and the insulating layers 4 are seated on an insulating hub 3 which, in turn, is secured to the shaft of the armature of the dynamo electric machine, not shown in FIG. 1. The shaft is shown, in combination with the armature, in FIG. 8, to which reference will be made below. The segments 2 are retained on the insulating hub 3 in any well-known and suitable manner, not further shown. The segments 2, at their axial ends facing the armature windings, are formed with radially projecting tabs or lugs 5. The lugs 5 are formed with open slots 6, extending axially parallel towards the armature winding.

In accordance with an embodiment of the invention, the slots 6 (FIGS. 1-5) are formed with a deviation from a plane surface, in the shape of a part-circular recess 7. The recess 7, which may be formed for example by drilling or punching, extends from about the surface of the commutator radially outwardly with respect to the axis of the shaft of the commutator. The recess 7 terminates at the base surface or root or bottom 8 of the slot 6. The recess 7, in its simplest form, is part-circular in cross section; it need not be so, however, but may have oval, polygonal, for example triangular shape or the like. The slot 6, in the region of the bottom 8, is formed with angled walls to provide a wedge-shaped or angled-off edge portion, forming engagement surfaces 9 which, as shown, are flat, although they need not be. The surfaces 8, 9, in combination with the side walls of the slot 6, will, upon insertion of terminal ends 10, 11 of the armature windings (see FIG. 2), form seating surfaces for the conductors.

The terminal ends 10, 11 of conductors of an armature 12 (FIG. 8) of the dynamo electric machine may be inserted at the same time on top of each other into the slot 6, as shown in FIGS. 2-3. The end 10 of the armature windings forms the bottom or underlay, and engages the engagement surfaces 9 as well as the bottom surface 8 of the slot 6. The end 11 forms the overlay, and is located on the underlay 10. In accordance with a feature of the invention, the ends 10, 11 are deformed to fit into the recess 7, and to form, with the recess 7, an interengaging projection-and-recess fit. The deformed portions 13, 14 of the ends 10, 11, obtained by compression or punching, thus provide a tight, secure connection with the segment 2, in which the area of engagement of the ends 10, 11, in axial direction, due to the interengaging projection-and-recess connection, is larger than a straight planar connection. The deformations 13, 14 of the ends of the windings are so arranged that the deformed material engages into the recess 7. This provides for a tight and secure vibration and shock-proof connection between the windings and the commutator segment 2. The connection is resistant to high temperatures, substantial temperature changes, and to circumferential forces arising in operation of the dynamo electric machine. The ends 10, 11 of the windings cannot be removed in axial direction from the slot 6 after the formation of the interengaging projection-and-recess connection 13, 14–7 between the ends 10, 11 and the commutator segments.

Ends 10, 11 with larger diameters are preferably individually deformed for connection with the associated segment 2. First, the underlay end 10 is inserted into the slot 6, and punch-deformed to fit tightly within the slot, and to engage the depression 7 (see FIG. 4). Thereafter, the overlay winding 11 is inserted into the slot 6 and likewise deformed to interengage with the recess 7—see FIG. 5. In the embodiment of FIGS. 2 and 3, both ends 10, 11 are deformed in one single punching or deforming operation.

In accordance with a feature of the invention, a plurality or all of the segments of the commutator can be connected at one time, by applying a plurality of connecting punches to the respective commutator segments into which one or more winding ends have been inserted.

The winding ends 10, 11 are connected with the associated segment 2 of the commutator by a punch or stamping device, in which at least one punch or punch stamp is guided longitudinally into the commutator 1, that is, axially towards the center of the respective commutator segment. The stamp or punch deforms the portions 13, 14 of the ends 10, 11 of the armature winding purely mechanically, and thus retains the ends 10, 11 within the slot 6 of the commutator 2 by mechanically tight, interengaging frictional fit. The compressive forces required are comparatively small since, usually, the windings of the armature are made of soft copper and thus only small deformation forces are required to fit the ends 10, 11 within the depressions 7 at the deformation points 13, 14.

The deviation from a planar flat surface of the side walls of the slots 6 need not be in form of a depression 7; as illustrated in FIGS. 6 and 7, the surface deviation may also be an extension into the slot. The slot 37 (FIGS. 6, 7) is formed with two oppositely directed circumferentially inwardly extending projections 38. These projections 38 which are preferably pointed are bounded at the sides facing the apex of the points by flanks 39 which include an obtuse angle. The projection 38 terminates at the bottom 8 of the slot 37. In accordance with a preferred feature, the inwardly directed projection 38, in top view, is essentially triangular; it need not be, however, but may be in form of a curved bulge, may be trapezoidal, or of square cross section.

The slot 37 is narrowed in wedge shape adjacent the bottom 8 thereof, forming the engagement surfaces 9.

The ends 10, 11 to be secured in the slots 37, are laid into the slot and then press-fitted and deformed in the slot. Upon stamping or pressing of the ends of the windings 10, 11—sequentially or at the same time, the material 13', 14' of the ends of the windings 10, 11 will deform around the projection 38, and escape towards the flanks 39. Again, an interengaging projection-and-recess fit—in circumferential direction—is provided, in which the projections extend from the lugs of the commutator segments and the recess is formed in the connecting wires—the reverse of the embodiment of FIGS. 1-5. Stamping or pressing the ends 10, 11 of the wires in the slot 37 may result in some top deformation of the ends 10, 11, as schematically indicated at 11a which shows the top deformation caused by a punch tool.

Winding attachment apparatus, with reference to FIGS. 8–16:

The base structure of the attachment apparatus is shown in FIG. 8 in schematic form. The armature 12 is received in a jig 15, which retains the armature shaft 16. The armature shaft has turned-down ends, as well known. The armature shaft 16 may be held in a single fixed position for each attachment operation, or may be sequentially stepped through annular positions as indicated by the broken rotation arrow R. The armature 12 has the commutator 1 and an armature winding 17 located thereon. The winding ends 10, 11 of the armature winding are to be secured in the slots 6 or 37 of the connecting lugs 5 of the commutator segment 2, which are not shown in detail in FIG. 8.

The attachment apparatus has a sleeve-like support collar 18 (see FIG. 9), which is reversed left-for-right with respect to FIG. 8, which surrounds the brush-engaging surface of the commutator segments of the commutator 1 up to the connecting lugs 5. The external diameter of the support collar 18 is just slightly smaller than the diameter of a theoretical circle formed by the bases 8 of the slots 6 or 37 of the commutator 1.

A punch stamp 19 is radially guided in a guide part 20 of the stamp, for movement radially with respect to the longitudinal axis of the commutator 1, and thus of apparatus portion 15. A guide finger 21 is movably supported on the part 20 to position the ends 10, 11 of the armature windings in the respective slots.

The guide finger 21 places the ends 10, 11 of the windings singly or commonly—as desired and in dependence on the diameter of the wires or conductors—in the slots 6 or 37, respectively, and maintains them in position in the slots while the punch 19 is moved downwardly to deform the portions 13, 14 or 13', 14', respectively, of the ends 10, 11 of the windings.

The underlay end 10, which is located on the base 8 of the slots 6 or 37, respectively, is pressed against the wedge-shaped or angled surfaces 9. One axial terminal end of the winding is located in position by a shoulder formed by the collar 18. The side of the connecting lug 5 facing the armature winding 17 has a flange-like extension 22 of the insulating hub located thereagainst, which has a radical extent just below the bottom surface 8 of the respective slots 6, 37; it supports the ends 10 of the winding at the side facing the armature 12.

The apparatus is particularly suitable for simultaneous deformation of the ends 10 of the windings in all the slots 6, 37, or in at least a substantial number thereof, for example in every other one, so that the step rotation R (FIG. 8) need index the armature only by one segmental division. A plurality of punch stamps 19′, each with its own guide finger 21′, can be provided, radially equidistantly spaced from each other, and directing punching forces radially towards the central axis of the commutator shaft. In a preferred form, at least, two punches 19, 19′, operating simultaneously and in counter-direction, are provided.

Figure 9:
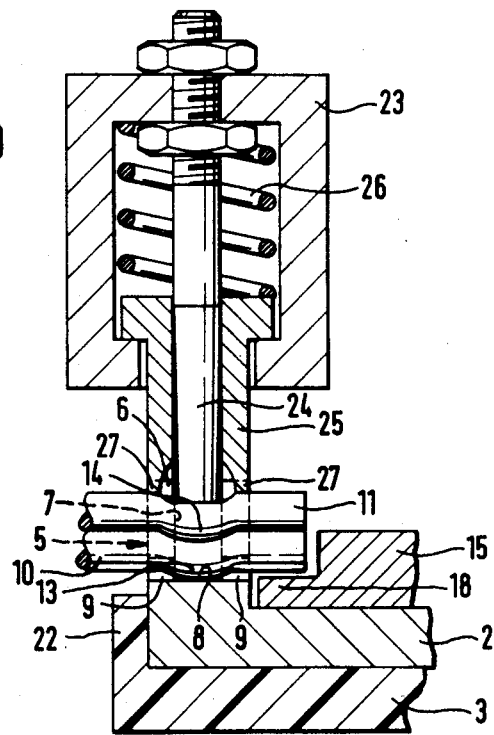
FIG. 9 is a fragmentary longitudinal view of another embodiment of a commutator connecting apparatus.

Various changes and modifications may be made in the punching apparatus; FIG. 8 only shows a basic structure. FIG. 9 illustrates a modification in which a holder 23 for the stamp is provided, guiding a punch stamp 24 radially with respect to the longitudinal axis of the commutator. The punch stamp 24 is surrounded by a hold-down element 25. The hold-down element 25 is retained in position by a spring 26, supported in the holder 23, and is resiliently engageable against ends 10, 11. The hold-down element 25 has two holding ends 27, which are slightly narrower than the width of the respective slots 6, 37. Looked at in longitudinal direction, the outer edges of the slots 6, 37 are slightly closer together than the outer edges of the hold-down ends 27, which, thus, extend axially slightly longer than the axial length of the connecting lug 5. The inner edges of the hold-down elements 27 are spaced from the punch stamp 24—see FIG. 9.

Operation—FIG. 9: After insertion of one or both of the ends 10, 11 of the armature conductors, the stamp 24 and the hold down element 25 are both moved radially towards the respective slots 6, 37, until the ends engage the respective winding, as shown in FIG. 9, the overlay end 11. After further downward movement, the hold-down element 25 will have engaged the ends 11 of the overlay winding, and the spring 26 will resiliently compress. The hold-down element will not move any further. Compressive force will, of course, be transferred to the underlay winding 10 at the bottom 8 of the slots 6, 37, and will retain the underlay winding by friction on the surfaces 9, and the bottom surface 8. The punch 24, however, is further forcibly moved downwardly and deforms the ends of the ends 10, 11 to form the punch projections 13, 14, which will escape and fit within the recesses 7 in the embodiment of FIG. 5, or to form the punch projections 13′, 14′ which will engage the surfaces at 39 adjacent the projections 38 in the embodiment of FIG. 6 to again form the interengaging projection-and-recess connection. The ends of the wires 10, 11 thus are held in position by the hold-down element 25, and specifically the end portions 27 thereof, and slip-out of one or the other of the wires, or both, from the slots 6, 37, and from alignment with the slots, is not possible.

Embodiment of FIGS. 10–14: Two hold-down elements and a two-part stamp are provided. The first hold-down element 25 is resiliently supported with respect to the stamp, and surrounds the first stamp portion 28—see FIG. 10. The resilient biasing can be as shown in connection with FIG. 9, for example by a spring similar to spring 26. The ends 27 of the first hold-down element 25 extend on the portions of the end 11 of the winding which are beyond the respective slots 6, 37. The stamp portion 28 is formed with a longitudinal bore 29 with an enlarged end portion 30 which is delimited by an internal ring shoulder 31. A second hold-down element 32 is located in the enlarged end portion 30 which, together with the stamp 28, can be engaged with the portions of the ends 10, 11 of the windings which are located within the slots 6, 37. The second hold-down element 32, in well-known manner and not further shown, is secured in the apparatus so that, upon an upward stroke, the portion of the stamp 28 remains on the part 14 of the end of the winding 11. The stamp part 28 is surrounded by a second stamp part, of which only the lower, operating ends 33 are shown, for simplicity of the drawing. The second stamp part is formed with two part-circular ends 33 which are located and positioned to engage the edge 34 of the recess 7 of the slot 6, or which can be positioned to engage the upper edges 36 of the flanks 39 of the slots (FIGS. 5, 6) immediately adjacent the projections 38.

Operation, with reference to FIGS. 10–14: Upon downward movement of the punch assembly formed by the hold-down elements and the two parts of the punches or stamps, the first hold-down element 25 engages the portions of the ends 10, 11 of the windings which extend beyond the respective slots 6, 37, and holds them in axial position during the attachment step. The first step portion 28 and the second hold-down element 32, acting conjointly, deform the portions 13, 14, 13′, 14′ of the ends 10, 11 of the conductors which are located in the respective slots, so that the deformed portions will fit into the recess 7 or, respectively, fit around the projections 38. The end of the winding or conductor 10, forming the underlay, will tightly engage the engagement surfaces 9 and the bottom 8 of the respective slots 6, 37.

After this initial engagement, the first stamp portion 28 is retracted; the hold-down elements 25, 32 remain on the ends of the windings 10, 11. The ends 33 of the second stamp part which ends were previously seated on the edge 34 of enlargement 7, or on the upper edges 36 of the diverging surfaces of the slot 37, are then forcibly moved downwardly and deform and deflect the edge 34, or respectively, the edges 36. This deformation of the edges 34, 36, respectively, radially seats additionally on the ends 10, 11 of the windings, are particularly the deformed portions 13, 14, 13′, 14′, within the slots 6, 37 of the commutator segment by providing an overlapping end portion of the commutator segment over the deformed ends 13, 14, 13′, 14′. The sequence of the deforming operations, with respect to a slot having the enlargement 7 (FIGS. 1–5), is shown, consecutively, in FIGS. 11, 12, and 13, in which FIGS. 10 and 14 are transverse views of FIGS. 11 and 13, respectively.

Embodiment of FIGS. 15 and 16: The general arrangement is identical to that described in connection with FIGS. 10–14; the second stamp or punch part is only formed with shearing ends 35 which engage the edges 36 of the slot 6 or 37, adjacent the enlargement 7, or the point 38 above the portions of the end 11 of the winding which forms the overlay, to provide a sheared clamping overlap strip or zone immediately adjacent to the deformations 13, 14, 13′, 14′ of the ends 10, 11 of the windings in the respective slots 6, 37. Folded-over flaps are thus formed as best seen in FIGS. 15 and 16 from the edge portions of the slot 6 of the commutator adjacent to the zone of the enlargement 7, or surrounding the projections 38 (not specifically shown).

Shearing the end portions 36 about the region of the ends 10, 11 of the conductors adjacent the enlargement 7 is particularly suitable for commutators with narrow connecting tabs 5. If insufficient width of material is available between the insulating slit 4 to an adjacent segment 2 and the enlargement 7, in order to press the rim or edge 34 of the enlargement 7 over the deformed zone 14, 13 as additional safe holding for the ends 10, 11 of the windings, shearing of the edges 36, to form sheared-over flaps, is suitable, since sufficient material is available adjacent the depression or slot enlargement 7 without damaging the insulation 4.

Various changes and modifications may be made, and any features described herein may be used with any of the others, within the scope of the inventive concept.

We claim:

1. In an armature (1) having armature conductors (10, 11, 17), an armature shaft (16) and a commutator (1), said commutator having a plurality of commutator segments (2) circumferentially located about the armature shaft and secured thereto, an armature conductor—commutator connection arrangement, in which the commutator segments (2) each have a radially projecting connecting tab or lug (5), said lug being formed with a slot (6, 37) in which an end portion of at least one armature conductor (10, 11) is located, wherein, in accordance with the invention, the side walls defining said slots are formed with at least one deviation (7, 38, 39) with respect to a plane which is at least approximately parallel to a plane passing through the longitudinal axis of the commutator and the center line of the slot;

said at least one deviation (7, 38, 39) extends radially with respect to said shaft from a region adjacent a bottom or root (8) of the slot up to essentially the outer circumference of the commutator; and wherein the end portion of an armature conductor (10, 11) positioned in the slot is formed with a surface distortion interfitting with said deviation of the side wall of the slot to form, in combination with said deviation, an interfitting projection-and-recess connection.

2. The armature of claim 1, wherein the deviation of said side walls comprises an elongated recess (7) extending radially and depressed circumferentially with respect to the longitudinal access of the commutator from the side walls defining the slot;

and wherein the surface distortion of the armature conductor (10, 11) in the slot comprises enlarged, deformed portions (13, 14) fitting into said recess (7) to form said interfitting projection-and-recess connection.

3. The armature of claim 2, wherein the side wall of the slot adjacent said recess (7) defines a terminal edge portion (34) at the outermost radial circumference of said wall, said edge portion overlapping said slot and the end portion of the conductor in the slot to engage above and around the projection-and-recess connection of the conductor, and radially clamp the distortion (13, 14) of the end portion of the conductor in the slot (6).

4. The armature of claim 2, wherein two armature conductors (10, 11) are provided, each having an end portion located in the slot (6, 37) and positioned above each other, whereby the end portion of one conductor will form an underlay (10) and the end portion of another conductor will form an overlay (11) of said conductors; and the side walls of the slot define edge portions (36), said edge portions overlapping that one of the armature conductors forming the overlay (11) and engaging said end portion to clamp the end portions of both armature conductors radially within the slot.

5. The armature of claim 2, wherein the interfitting projection-and-recess connection of the distorted end portion (13, 14) of the armature conductor in the recess comprises a press fit made by deformation of the armature conductor.

6. The armature of claim 1, wherein the deviation of said side walls comprises an elongated projection (38) extending essentially radially with respect to the longitudinal axis of the commutator (1) and projecting inwardly into the slot (37), the side walls of the slot adjacent the projection (38) forming receding flanks (39); and wherein the surface distortion of the end portions of the armature conductor (10, 11) comprises recesses formed in the armature conductor fitting around said projection, said projection (38) and said recess forming the interfitting projection-and-recess connection, the armature conductor, in the region adjacent the recess, fitting around said projection and engaging, at least in part, the flanks (39) of the side walls.

7. The armature of claim 6, wherein the side walls adjacent the slot (6, 37) adjacent said deviation define radially projecting edge portions (38);

and wherein said radially projecting edge portions overlap above and around towards said plane and in engagement with the end portion of the conductor closest to said edge portion of the wall defining the slot, for radially clamping the distortion (13, 14; 13', 14') of the end portions of the conductor in the slot.

8. The armature of claim 6, wherein two armature conductors (10, 11) are provided, each having an end portion located in the slot (6, 37) and positioned above each other, whereby the end portion of one conductor will form an underlay (10) and the end portion of another conductor will form an overlay (11) of said conductors; and the side walls of the slot define edge portions (36), said edge portions overlapping that one of the armature conductors forming the overlay (11) and engaging said end portion to clamp the end portions of both armature conductors radially within the slot.

9. The armature of claim 6, wherein two armature conductors (10, 11) are provided, each having an end portion located in the slot (6, 37) and positioned above each other, whereby the end portion of one conductor will form an underlay (10) and the end portion of another conductor will form an overlay (11) of said conductors; and the side walls of the slot define edge portions (36), said edge portions overlapping that one of the armature conductors forming the overlay (11) and engaging said end portion to clamp the end portions of both armature conductors radially within the slot.

10. The armature of claim 6, wherein two armature conductors (10, 11) are provided, each having an end portion located in the slot (6, 37) and positioned above each other, whereby the end portion of one conductor will form an underlay (10) and the end portion of another conductor will form an overlay (11) of said conductors; and the side walls of the slot define edge portions (36), said edge portions overlapping that one of the armature conductors forming the overlay (11) and engaging said end portion to clamp the end portions of both armature conductors radially within the slot.

11. The armature of claim 6, wherein the interfitting projection-and-recess connection of the distorted end portion of the armature conductor in the recess around said projection (38), projecting inwardly of the slot, comprises a press fit made by distortion of the end portion of the armature conductor.

12. The armature of claim 1, wherein the bottom (8) of the slot (6, 37) is formed with inclined lateral surfaces (9) adjacent the side wall, and merging into a flat bottom (8).

13. The armature of claim 1, wherein two armature conductors are provided, each having an end portion (10, 11) located in one slot (6, 37); and wherein the distortions of the end portions of the conductors are essentially similar to provide for each of said end portions of the armature conductors, essentially similar projection-and-recess connections with the respective commutator segment (2).

14. The armature of claim 13, wherein the interfitting projection-and-recess connection of the distorted end portion of the armature conductor in the recess around said projection (38), projecting inwardly of the slot, comprises a press fit made by distortion of the end portion of the armature conductor.

15. The armature of claim 1, wherein two armature conductors are provided, each having an end portion (10, 11) located in one slot;

said end portions within the slot being positioned above each other, whereby the end portion of one conductor will form an underlay (10) and the end portion of another conductor will form an overlay (11) of conductors; and wherein the distortions of the end portions of the conductors are individual to said conductors, each engaging said deviation (7, 38, 39) to form individual projection-and-recess connections between said end portions and the lugs (5) of the commutator.

16. The armature of claim 1, wherein the side walls adjacent the slot (6, 37) adjacent said deviation define radially projecting edge portions (38);

and wherein said radially projecting edge portions overlap above and around towards said plane and in engagement with the end portion of the conductor closest to said edge portion of the wall defining the slot, for radially clamping the distortion (13, 14; 13', 14') of the end portions of the conductor in the slot.

17. The armature of claim 1, wherein two armature conductors (10, 11) are provided, each having an end portion located in the slot (6, 37) and positioned above each other, whereby the end portion of one conductor will form an underlay (10) and the end portion of another conductor will form an overlay (11) of said conductors; and the side walls of the slot define edge portions (36), said edge portions overlapping that one of the armature conductors forming the overlay (11) and engaging said end portion to clamp the end portions of both armature conductors radially within the slot.

18. The armature of claim 1, wherein the interfitting projection-and-recess connection of the distorted end portion of the armature conductor in the recess around said projection (38), projecting inwardly of the slot, comprises a press fit made by distortion of the end portion of the armature conductor.

* * * * *